F. W. STILWILL.
CALCULATING MACHINE.
APPLICATION FILED JULY 16, 1913.

1,269,876.

Patented June 18, 1918.
5 SHEETS—SHEET 1.

Witnesses:

Inventor:
Fred W. Stilwill

F. W. STILWILL.
CALCULATING MACHINE.
APPLICATION FILED JULY 16, 1913.

1,269,876.

Patented June 18, 1918.
5 SHEETS—SHEET 2.

Witnesses:
J. C. Devick.
George L. Chrisdahl.

Inventor:
Fred W. Stilwill.
By Luther L. Miller
Atty.

F. W. STILWILL.
CALCULATING MACHINE.
APPLICATION FILED JULY 16, 1913.

1,269,876.

Patented June 18, 1918.
5 SHEETS—SHEET 3.

Witnesses:
J. C. Devick
George L. Chridahl

Inventor:
Fred W. Stilwill.
By Luther L. Miller
Atty.

F. W. STILWILL.
CALCULATING MACHINE.
APPLICATION FILED JULY 16, 1913.

1,269,876.

Patented June 18, 1918.
5 SHEETS—SHEET 5.

Witnesses:
J. C. Devick.
George L. Chindahl.

Inventor:
Fred W. Stilwill.
By Luther L. Miller
Atty.

# UNITED STATES PATENT OFFICE.

FRED W. STILWILL, OF CHICAGO, ILLINOIS, ASSIGNOR OF ONE-HALF TO GEORGE M. ATWELL, OF CHICAGO, ILLINOIS.

CALCULATING-MACHINE.

1,269,876.  Specification of Letters Patent.  Patented June 18, 1918.

Application filed July 16, 1913. Serial No. 779,240.

*To all whom it may concern:*

Be it known that I, FRED W. STILWILL, a citizen of the United States, residing at Chicago, in the county of Cook and State of Illinois, have invented certain new and useful Improvements in Calculating-Machines, of which the following is a specification.

This invention relates to machines for performing arithmetical calculations, such as addition and subtraction; and its object is to produce a mechanism of simple construction and containing a relatively small number of parts, and which shall be simple and convenient to operate.

In the accompanying drawings.

The embodiment which I have selected to illustrate the invention comprises a set of adding wheels, a master gear wheel, a set of ten number keys, each key except the "naught" key being arranged to rotate the master wheel through a given distance, an intermediate gear wheel arranged to be rotated by the master wheel and adapted to rotate the adding wheels, and a set of column selector keys for moving the said intermediate gear wheel into mesh with the adding wheel that represents the highest order in the item to be added.

The construction of the adding wheels (of which there may be any desired number, depending upon the capacity which the machine is designed to have) is best illustrated in Figs. 9 to 13, inclusive. Herein I have shown nine adding wheels, 1 adapted to register up to 999,999,999. They are shown as carried by a shaft 2 mounted in the supporting framework. Each wheel is rotatably mounted upon a spacing sleeve 3 which surrounds the shaft 2. Nine cam disks 4 are stationarily mounted upon the shaft 2 and are spaced apart by the sleeves 3, said disks being held against rotation by reason of the fact that the shaft 2 is flattened at 5 and passes through correspondingly shaped openings in the cam-plates. Nuts 6 clamp the sleeves 3 and cam-plates 4 rigidly together.

Figure 1:
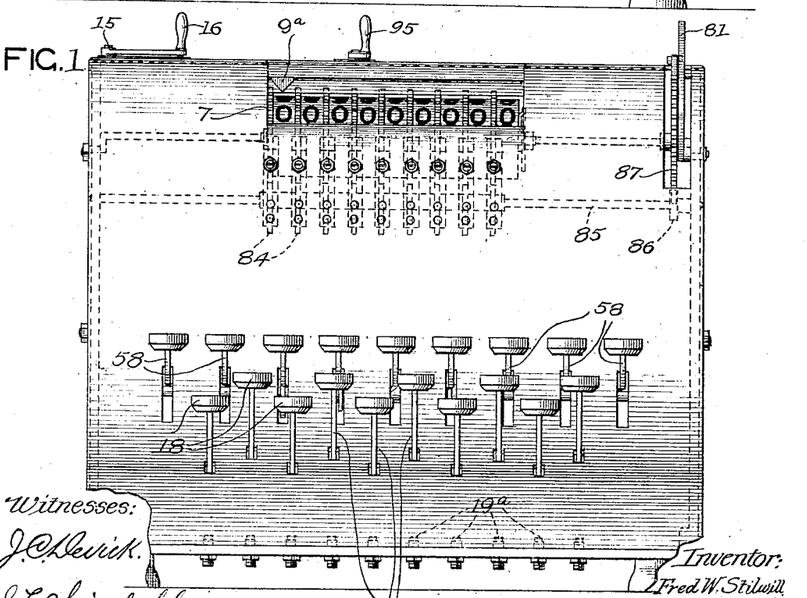
Figure 1 is a front elevation of a calculating machine embodying the features of my invention.

The adding wheels 1 are rotatably mounted upon the sleeves 3. Upon the periphery of each wheel is the series of digits. The set of adding wheels is so arranged with reference to the inclosing casing that a portion of the periphery of each wheel may be observed through a sight opening 7 in the casing. (See Fig. 1.) Each of the adding wheels is provided with a peripheral series of gear teeth 8 adapted to mesh with an intermediate gear wheel 9. Said gear wheel is slidably mounted upon a shaft 10 rotatably supported in the framework and has a spline connection with said shaft. The shaft 10 is driven from a master gear wheel 11 through the medium of either of two pinions 12 and 13, the pinion 12 being arranged to drive the shaft 10 in one direction for the performance of addition, and the pinion 13 being arranged to drive the shaft in the opposite direction to subtract. The pinion 12 is slidably mounted upon, and has a spline connection with the shaft 10. The pinion 13 is rotatably and slidably mounted upon a stub shaft 14. The pinions 12 and 13 are continually in mesh with each other. They may be moved laterally, to place either in mesh with the master wheel, by suitable means, as, for example, a vertical rock-shaft 15 having a handle 16 at its upper end and a lever 17 at its lower end, said lever being provided at its ends with studs entering grooves in the hubs of said pinions. It will be seen that when the handle 16 is turned in one direction, the pinion 12 will be moved into mesh with the master wheel and that the pinion 13 will be moved out of mesh with the master wheel. Movement of the handle in the opposite direction will place the pinion 13 in mesh with the master wheel, and remove the pinion 12 from engagement with said master wheel. Any suitable means may be provided, if desired, to hold the shaft 15 in either of its operative positions.

The master wheel is loosely mounted on a fixed shaft 11$^a$ and is arranged to be rotated by means of nine number keys 18, numbered 1 to 9, inclusive, each key being attached to a key lever 19, and the rear ends of said key levers being pivoted at 20. There is also a key lever 19 for the "naught". A coiled spring 21 provided for each key lever tends to hold the same in normal position against a stop rod 22. Stops 19$^a$ limit the downward movement of the key levers. Each of the key levers 19, except the "naught" key lever, is connected by means of a link 23 to an arm 24 loosely mounted upon the shaft 11$^a$. Underlying the arms 24 is a universal bar 25 attached at its ends to arms 26 and 27 which are loosely mounted on the shaft 11$^a$. It will be seen that whenever one of the number keys 18 is depressed, the universal bar 25 will be depressed, thereby swinging the arm 27 downwardly. The arms 24 are made of such relative lengths that each of the key levers 19 imparts to the arm 27 a different extent of movement. Rotatably mounted upon the arm 27 is a pinion 28 which meshes at all times with the master wheel 11. A spring 29 tends to hold the arm 27 in the position shown in Fig. 6. 30 indicates a rack curved upon the arc of a circle concentric with the axis of the master wheel 11. Said rack is attached to a slide 31 which is mounted for horizontal forward and backward movement in guides 32. The upper end of the rack 30 is guided in a fixed slotted guide 33. When the parts are in the position shown in Fig. 6, the space between the rack 30 and the master wheel 11 is just sufficient to allow the pinion 28 to rotate downwardly therein. It will be seen that when any one of the number keys 18 is depressed, the arm 27 will be swung downwardly, thereby moving the pinion 28 along the rack 30 and causing the master wheel 11 to rotate. The rotation of the master wheel is transmitted through one or both of the pinions 12 and 13 to the shaft 10 and thence through the intermediate gear wheel 9 to the adding wheel with which said intermediate gear wheel is in mesh. Reverse rotation of the master wheel is prevented by a locking dog 31$^a$.

Figures 3, 4, 5:
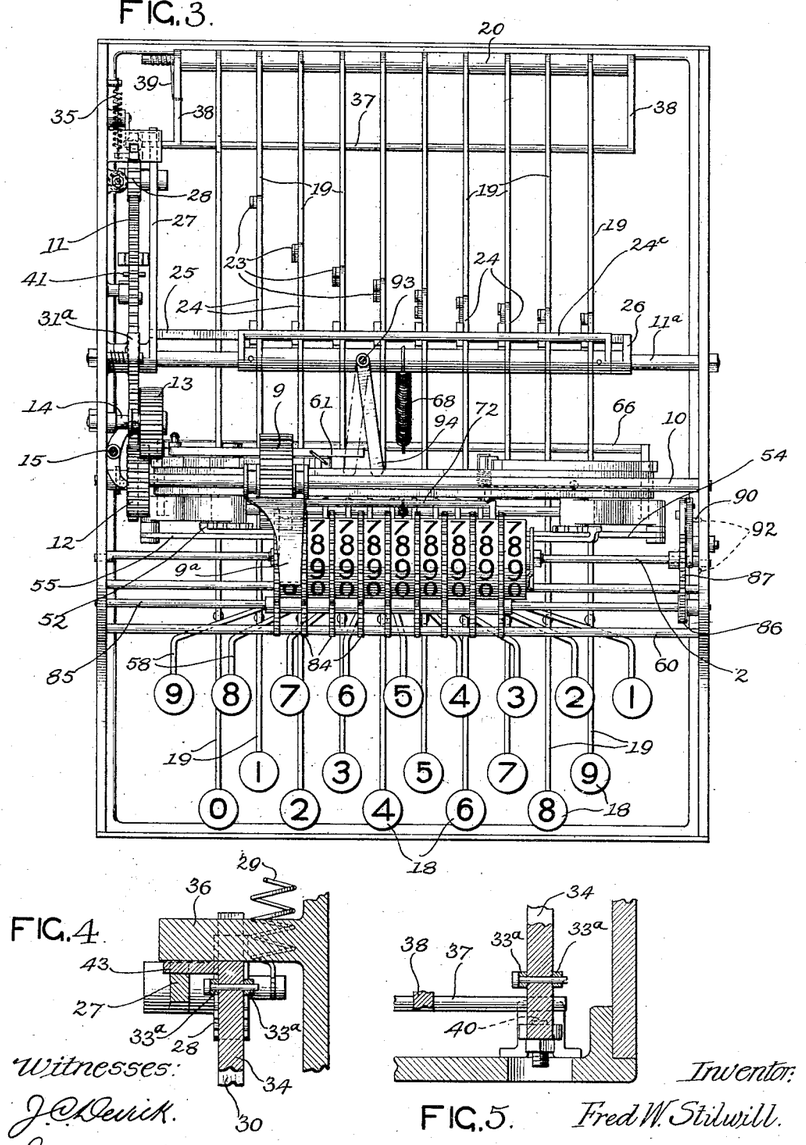
Fig. 3 is a top plan view of the mechanism, a portion of the inclosing casing being omitted.
Figs. 4 and 5 are fragmental sectional details.

When the arm 27 has completed its downward movement, the rack 30 is moved rearwardly out of mesh with the pinion 28 in order that the arm 27 may be returned to its initial position. For this purpose the slide 31 and rack 30 are connected to two stationary bosses 32 on the framework by means of two pairs of toggle levers 33$^a$, the joints of said toggle levers being connected by means of a bar 34. A spring 35 tends to move the slide 31 and rack 30 rearwardly to carry said rack out of mesh with the pinion 28, but such movement is normally prevented by reason of the fact that the toggle levers 33$^a$ are thrown upwardly slightly beyond dead center, the upper end of the bar 34 bearing against the rigid stop 36 (Fig. 4). A universal bar 37 is attached to two arms 38 which are pivotally mounted upon the axis 20, said bar underlying all of the key levers 19 and being held against said key levers by a spring 39. One end of the universal bar 37 overlies a stop 40 on the bar 34. The stop 40 is so positioned that just as the key lever reaches the limit of its downward movement, the universal bar 37 engages said stop and moves the bar 34 downwardly far enough to carry the toggle levers over dead center, whereupon the spring 35 immediately withdraws the rack 30 from engagement with the pinion 28. The extent of movement caused by the spring 35 is limited by a stop pin 41 and by the end wall 42 of the slot in the guide 33. When the operator removes his finger from the key lever, the spring 21 for that lever restores the lever to normal position, and the spring 29 raises the arm 27 to its initial position. As the arm 27 swings upwardly, the end thereof comes into engagement with a lug 43 (Fig. 4) on the bar 34, and raises said bar into normal position, thereby restoring the rack 30 to normal position.

To prevent the master wheel 11 from rotating through momentum or otherwise after the key lever has reached its limit of downward movement, I provide suitable means such as a dog 44 pivoted to the framework at 45, said dog being connected to the slide 31 so that as the slide is withdrawn rearwardly, the tooth of said dog will be projected into the path of the teeth of the master wheel.

Figures 20, 21, 22:
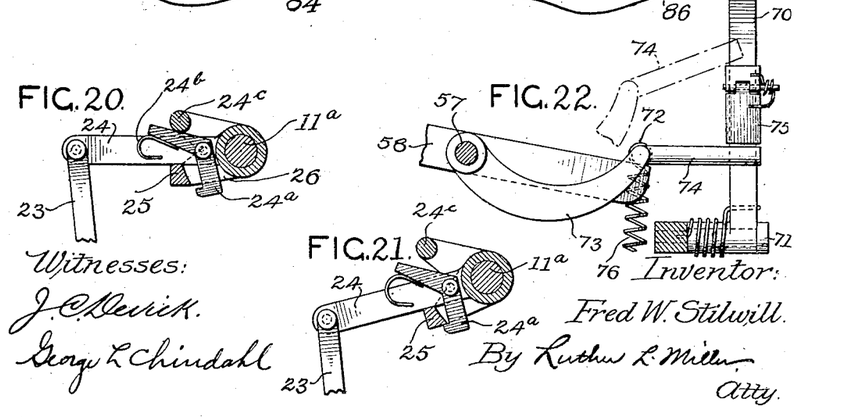
Figs. 20 and 21 illustrate a means for locking the number key levers to a certain universal bar.
Fig. 22 is a view of some of the parts shown in Figs. 7 and 8.

Should the operator fail to depress a given number key 18 to the full extent, it is desirable that his attention be called to the fact. This is accomplished by devices that act to lock the key to the universal bar 25, so that if said key be not fully depressed said key shall stay in its partially depressed position when the operator lifts his finger off the key. The devices referred to comprise a series of latches 24$^a$ (Fig. 20), one latch being pivotally mounted on each arm 24, and each latch being adapted to engage the universal bar 25 to lock said arm and bar together. A spring 24$^b$ tends to throw the latch into locking position. When the arm 24 is in its upper position, the latch is held out of engagement with the universal bar by a stationary trip rod 24°. As soon as the operator starts to depress a number key 18, the latch 24ª corresponding to that key locks the arm 24 to the bar 25. If now the operator removes his finger from the key before the latter has been fully depressed, the key will remain partially depressed, since the spring 29 cannot restore the pinion 28 and the universal bar 25 to their normal upper positions until the rack 30 has been moved rearwardly. The sight of the partially depressed key, or the realization that the key has not followed his finger as the latter was lifted, informs the operator that the key has not been fully depressed. Moreover, if the operator depresses another key he will observe the absence of the usual amount of resistance to the depression of such other key.

Before an item can be accumulated, the intermediate gear wheel 9 must be laterally moved into mesh with the adding wheel corresponding to the highest order in said item. For example, if the item to be added is 1000, the intermediate gear wheel 9 is moved into mesh with the "thousands" adding wheel, (the fourth wheel, counting from the right in Fig. 9) before the operator depresses the number keys 18 to set up the item. The proper numerical order, or column, is selected by means of the devices to be now described.

The intermediate gear wheel 9 is mounted in a carrier 46 which is attached to an endless belt 47 running about and secured to two wheels 48 and 49 supported in the machine frame, the axes of said belt wheels being parallel. Fixed to the axes of said belt wheels are pinions 50 and 51, respectively, which mesh with segments 52 and 53, said segments being carried upon levers 54 and 55, respectively. The levers 54 and 55 are pivoted at 56 56 and extend in opposite directions so that one crosses in front of the other. Upon a rock-shaft 57, journaled in the machine frame and extending in front of the levers 54 and 55, are loosely mounted a plurality of column selector key levers 58, there being one such lever for each numerical order represented by the series of adding wheels 1. Individual springs 59 tend to hold the column selector key levers in normal position against a stop rod 60. The rear ends of the column selector key levers underlie the segment levers 54 and 55. Whenever one of the column selector keys is depressed, the rear end of the key lever to which said key is attached engages one of the segment levers and swings said segment lever upwardly, thus imparting movement to the belt 47. Downward movement is thereby also imparted to the other segment lever. As soon as said other segment lever in its downward movement comes into contact with said column selector key lever, further movement of the column selector key lever and the segment levers (and consequently of the belt 47) becomes impossible. By reference to Fig. 2, it will be apparent that the column selector key levers have a uniform amount of depression, and that each of said column selector levers is capable of causing movement of the carrier 46 in either direction to place the intermediate gear wheel 9 in the position represented by said column selector key lever. Assuming the parts to be in the position indicated in Fig. 2: If the column selector key for the ninth column or numerical order be depressed, said key lever will engage the segment levers 54 and 55 at the point where said levers cross each other, as shown in said figure, and, therefore, will impart no lateral movement to the intermediate gear wheel 9. If the column selector key lever for the fifth numerical order be depressed, said key lever will cause lateral movement of the intermediate gear wheel 9 into engagement with the fifth adding wheel 1 (counting from the right in Fig. 9). If now the column selector key lever for the seventh numerical order be depressed, said key lever will engage the segment lever 55 and cause the intermediate gear wheel 9 to move laterally into mesh with the seventh adding wheel. Thus it will be seen that no matter where the intermediate gear wheel 9 may be located upon the shaft 10, said gear wheel may be shifted to the desired position by depressing the proper column selector key lever.

9ª is an indicator attached to the carrier 46 and extending into position to be observed through the sight opening 7.

Figure 2:
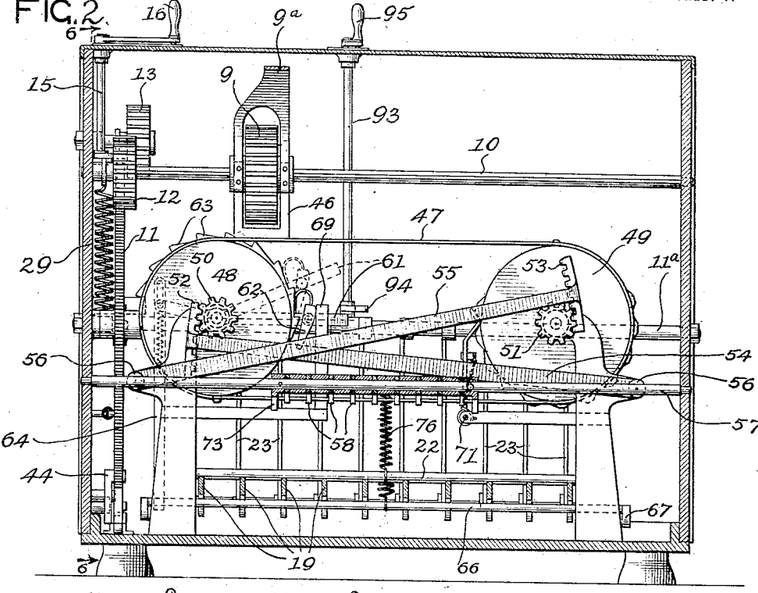
Fig. 2 is a vertical sectional view of said machine, the view being taken in the plane of dotted line 2 2 of Fig. 6.
Figures 6, 7, 8:
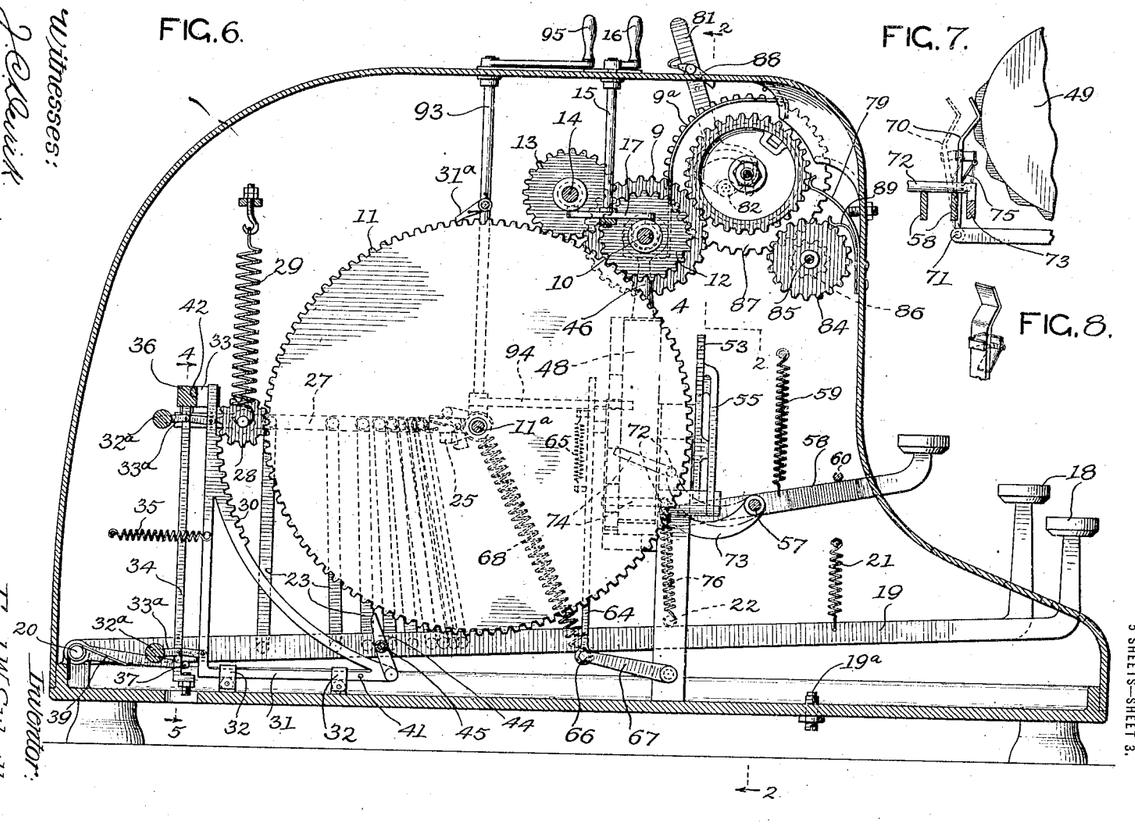
Fig. 6 is a view taken in the plane of dotted line 6 6 of Fig. 2.
Figs. 7 and 8 illustrate a means for preventing casual movement of a shiftable gear wheel comprised in the mechanism.
Figure 9:
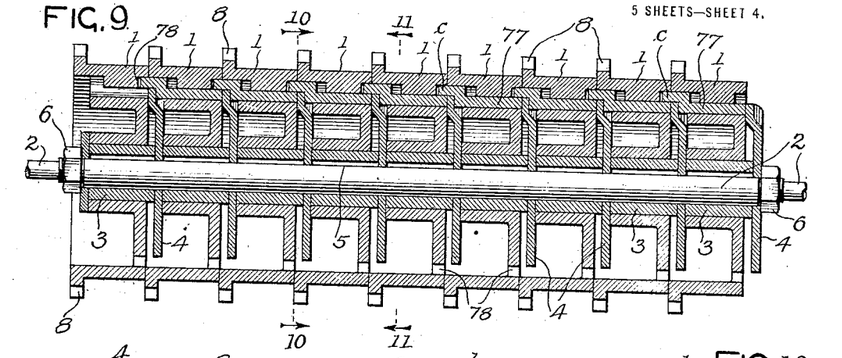
Fig. 9 is a longitudinal sectional view of the counter.

The intermediate gear wheel 9 having been properly positioned so as to mesh with the adding wheel corresponding to the highest numerical order in the item which is to be accumulated, said gear wheel is thereafter automatically moved to the successive lower orders as the operator sets up the item. For example, in setting up the item 1913, the operator first uses the column selector key lever bearing the numeral 4, shown in Fig. 3, thus placing the intermediate gear wheel 9 in mesh with the "thousands" adding wheel. The operator then depresses the number keys numbered one, nine, one, three, the intermediate gear wheel automatically moving first to the "hundreds" adding wheel, then to the "tens" adding wheel and then to the "units" adding wheel. The means for thus automatically shifting the intermediate gear wheel 9 is as follows:

Loosely mounted upon the axis of the belt wheel 48 is a lever 61, one arm of which carries a spring-pressed pawl 62 arranged to engage ratchet teeth 63 upon the periphery of said belt wheel. The other arm of the lever 61 has a pin and slot connection with a link 64. A spring 65 (Fig. 6) normally holds the pin against the lower end wall of the slot. Said link is attached to a universal bar 66 which is carried by pivoted arms 67, said universal bar underlying all of the key levers 19. A coiled spring 68 normally holds the universal bar 66 in its uppermost position, as represented in Figs. 2 and 6. It will be seen that when any one of the key levers 19 is depressed, the lever arm that carries the pawl 62 will be raised. When the operator removes his finger from the key of said key lever, the spring 68 will raise the universal bar 66 and thereby tilt the lever 61 in the direction to cause the pawl 62 to turn the belt wheel through the distance of one tooth space, thus causing the wheel 9 to move laterally to the next lower numerical order. As the wheel 9 completes its movement to such lower numerical order, the pawl 62 is cammed out of engagement with the ratchet tooth by a stationary trip or projection 69 with which the rear end of the pawl comes into contact.

In order to prevent accidental lateral movement of wheel 9, and in order to assist in accurately locating said wheel, I have provided a spring-pressed finger 70 pivoted at 71 and having a V-shaped portion which is adapted to lie in V-shape notches formed in a flange on the belt wheel 49. To reduce the amount of resistance to the operation of the column selector key levers I have provided means for temporarily withdrawing the finger 70, which means comprises a universal bar 72 attached to two arms 73 which are fixed on the rock-shaft 57, said universal bar overlying the rear ends of all of the column selector key levers. At one end of said bar is a pin 74 which, when the bar is raised through the operation of one of the column selector key levers, engages an inclined spring-held switch plate 75 attached to the finger 70, whereby said finger is swung away from the belt wheel 49. As soon as the pin 74 passes above the switch plate, the finger 70 springs back into engagement with the belt wheel. When the operator removes his finger from the column selector key lever, a spring 76 restores the universal bar 72 to normal position. In its downward movement the pin 74 passes through the space between the finger 70 and the spring-held switch plate 75, said spring plate yielding to allow the pin 74 to pass downwardly without affecting the finger 70.

The mechanism for carrying from one numerical order to the next higher order comprises the cam disks 4 hereinbefore mentioned, and plungers 77 slidably mounted in the adding wheels for movement parallel with the axis of said wheels. Every two adjacent cam-plates 4 form between them a path through which one of the plungers 77 travels as the adding wheel that carries said plunger rotates. Said cam-plates confine the plunger against casual endwise movement. At one point the cam-plates are bent or offset laterally so as to form an offset in the path of the plunger and thus cause the plunger to move laterally far enough to engage and move the adding wheel of next higher order. The ends $a$ and $b$ of the plunger are tapered or pointed and lie between the peripheral portions of the cam-plates. On one end of the plunger is a lug $c$ having a square end adapted to enter any one of ten recesses 78 in the adding wheel of next higher order.

Figure 15:
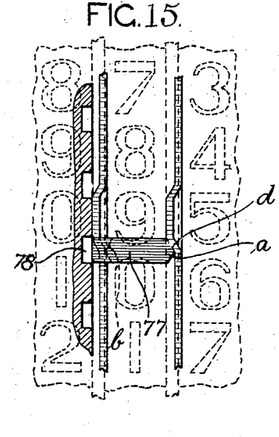
Figs. 15, 16 and 17 illustrate the action of the transfer mechanism.
Figure 16:
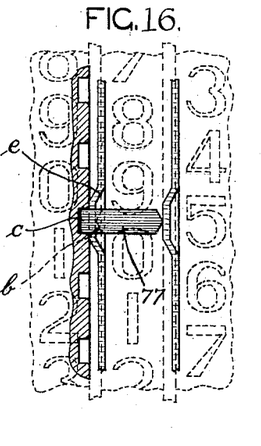
Figure 17:
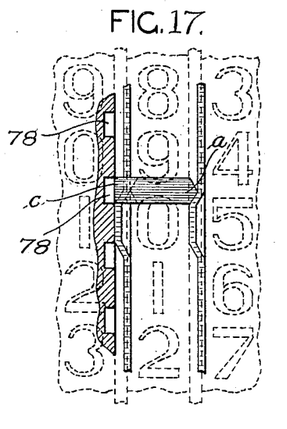

The operation of the transfer or carrying mechanism will be best understood by a consideration of Figs. 15, 16, and 17. Fig. 15 represents three adding wheels which may be assumed to be the "units", "tens" and "hundreds" wheels, said wheels being shown at rest, and the total "95" being visible through the sight opening 7. If the operator adds 10 to this total, the movement of the "tens" wheel will cause the tapered end $a$ to ride up on the cam surface $d$, whereby the lug $c$ of the plunger is forced into the recess 78 of the "hundreds" wheel, thus causing the "hundreds" wheel to rotate with the "tens" wheel. In Fig. 16, the "tens" wheel and the "hundreds" wheel are assumed to be moving. When the tapered projection $b$ rides up on the surface $e$, the lug $c$ will be withdrawn from the recess 78, such withdrawal being completed as the "tens" wheel comes to rest in the position shown in Fig. 17. The total "105" is now visible through the sight opening.

In order to prevent accidental rotation of the adding wheels, I provide for each wheel a spring finger 79 (Fig. 6) which bears against the teeth 8. It will be apparent that the spring fingers 79 also assist to complete the carrying movements of the adding wheels, since as soon as the point of the tooth 8 has passed the end of the spring finger, said finger will bear against the side of the tooth and turn the wheel until the end of said finger bears against two adjacent teeth.

Figures 10, 11, 12, 13, 14:
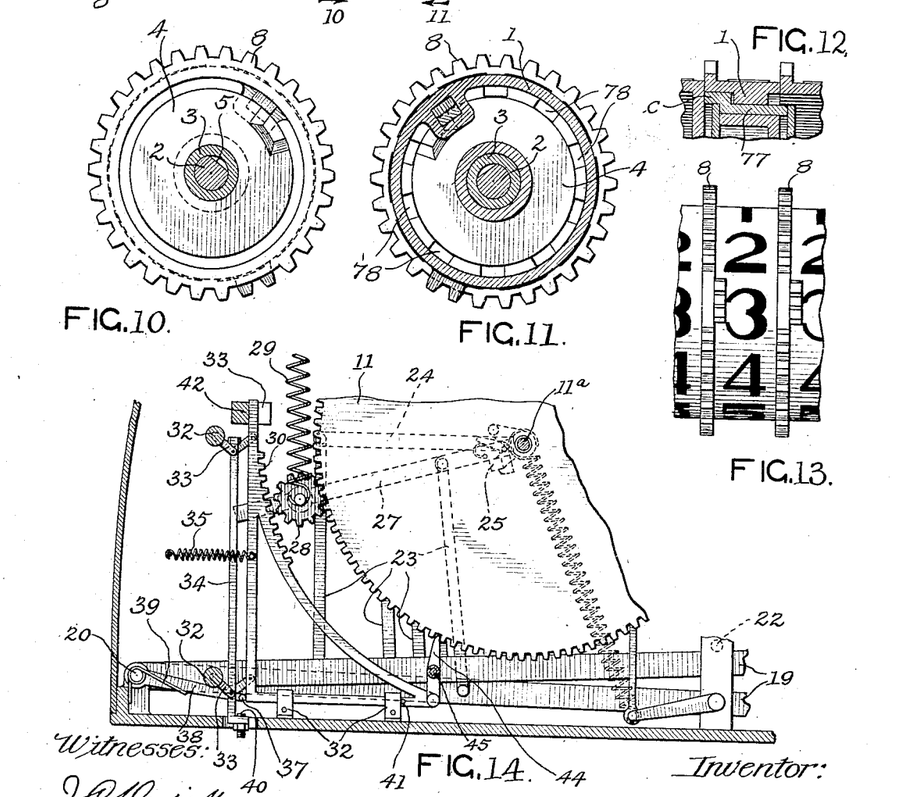
Figs. 10 and 11 are sectional views taken in the plane of dotted lines 10 10 and 11 11, respectively, of Fig. 9.
Fig. 12 is a fragmental detail view illustrating the transfer or carrying mechanism.
Fig. 13 is a fragmental elevation of the counter.
Fig. 14 is a fragmental view illustrating some of the parts shown in Fig. 6, but in a position different from that represented in the last mentioned figure.
Figure 18:
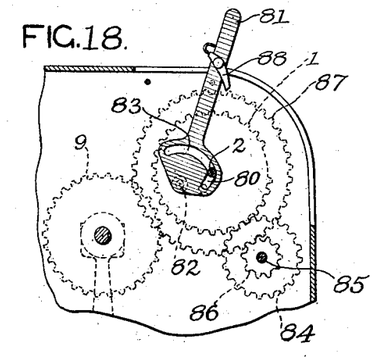
Figs. 18 and 19 represent the operation of the clearing mechanism.
Figure 19:
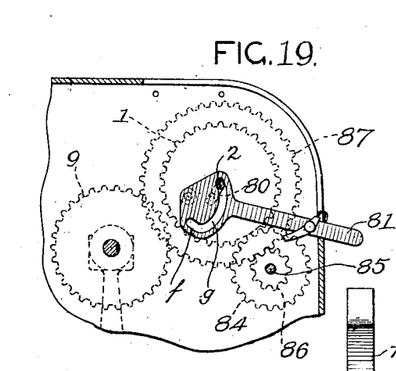

In order to clear the machine (that is to say, in order to set all of the adding wheels 1 at zero), I provide the means to be now described. The shaft 2 has cranked ends 80 (Figs. 18 and 19) which are suitably journaled in the supporting frame. A finger lever 81 is pivoted to the framework at 82 and comprises a portion having a slot 83 therein. The shaft 2 extends through said slot. The slot 83 comprises the cam portion $f$ and the dwell portion $g$. It will be seen that when the finger lever 81 is drawn forwardly, the cam portion $f$ of the slot 83 will cause the shaft 2 to swing forwardly, thereby carrying the adding wheels out of position to mesh with the intermediate gear wheel 9 and into mesh with a series of gear wheels 84. There is one gear wheel 84 for each adding wheel. The gear wheels 84 are fixed upon a shaft 85 journaled in the supporting frame. Fixed on the shaft 85 is a pinion 86 which is adapted to mesh with a gear wheel 87 which is loosely mounted on the shaft 2. On the finger lever 81 is a dog 88 arranged to engage the teeth of the gear wheel 87 after said lever has been swung forward far enough to bring the adding wheels into mesh with the gear wheels 84. It will be seen that as the finger lever is drawn forwardly, the adding wheels will first be moved into mesh with the gear wheels 84 and will then be rotated through the medium of the gear wheel 87, the pinion 86 and the gear wheels 84. In order that such rotation of each adding wheel shall cease as soon as the cipher thereon reaches the initial position, to wit, that shown in Fig. 7, the series of gear teeth 8 on each adding wheel is interrupted by offsetting one or more of said teeth, as best shown in Fig. 13, the offset teeth of each adding wheel being out of the vertical plane of the respective gear wheel 84. Thus, as soon as the blank spaces caused by the offsetting of the gear teeth arrive opposite the gear wheels 84, the adding wheels cease to be rotated by said gear wheels 84. The spring fingers 79 are of sufficient width to bear upon all of the gear teeth 8, including those that are offset.

To prevent casual rotation of the gear wheels 84, suitable means may be provided such as a spring finger 89 bearing against the teeth of one of said gear wheels.

The hand lever 81 may be yieldingly locked to hold the adding wheels either in or out of operative relation to the intermediate gear wheel 9, by suitable means, as, for example, a projection 90 (Fig. 3) on said lever adapted to spring into either one of two recesses 92 in an adjacent portion of the machine frame.

It sometimes occurs that a series of items each comprising the same numerical orders are to be added. In order to reduce the number of actuations of the column selector key levers required in adding such a series of items, I have provided the means to be now described.

93 (Fig. 2) indicates a vertical rock-shaft supported in the machine frame and having fixed to its lower end a stop arm 94 arranged to overlie the end of the pawl-carrying lever 61. Upon the upper end of the shaft 93 is an actuating handle 95 by means of which the shaft may be locked to place the stop arm 94 above the lever 61. When the lever 61 is so locked, the intermediate gear wheel 9 will not be moved from order to order as the number keys 18 are depressed by the operator. Assuming that a series of items, of which the thousands is the highest numerical order, are to be added, the operator depresses the "thousands" column selector key lever 58 and then operates the handle 95 to place the stop arm 94 over the lever 61. The operator may now proceed to set up the "thousands" digits of all of the items. When this operation has been completed, the operator operates the "hundreds" column selector key lever to place the gear wheel 9 in mesh with the "hundreds" adding wheel, and then proceeds to set up the "hundreds" digits of all of said items. The same procedure is followed in setting up the "tens" and "units" of the items. The purpose of the yielding connection between the lever 61 and the link 64 is to permit the link 64 to move while the lever 61 is locked by the stop arm 94. If desired, suitable means may be provided for locking the shaft 93 in adjusted position.

It is thought that the operations of adding and clearing will be fully understood from the foregoing description. To subtract an item from the amount accumulated on the adding wheels 1, the handle 16 is operated to place the pinion 13 in mesh with the master wheel 11, and the item to be subtracted is then set up in the usual way, the wheels 1 concerned in the operation being rotated in a reverse direction.

While I have described the present embodiment of the invention with considerable particularity, I would have it understood that the invention is not limited to the details specified, but that various modifications may be made within the scope of the appended claims.

I claim as my invention:

1. A calculating mechanism comprising two adding wheels arranged side by side; a rectilinearly-reciprocal plunger carried by one of said wheels and arranged to engage the other wheel, and two stationary cam members simultaneously engaging opposite end-portions of said plunger for moving said plunger into and out of engagement with said other wheel during the rotation of the plunger-carrying wheel.

2. A calculating mechanism comprising a master wheel; a shaft driven from said master wheel; a set of number wheels; a wheel on said shaft for driving said number wheels; a series of order-keys; means operable by any one of said order-keys for shifting said driving wheel in either direction on said shaft into operative relation to the desired number wheel; and other key operated means for rotating said master wheel.

3. A calculating mechanism comprising a master wheel; a shaft driven from said master wheel; a set of toothed counter wheels, a gear wheel on said shaft adapted to mesh with said counter wheels, a single series of order keys; means operable by an order key for shifting said gear wheel in either direction on said shaft into operative relation to the desired counter wheel; and other key-operated means for rotating said master wheel.

4. A calculating mechanism comprising a master wheel, a shaft, a set of number wheels rotatable in one direction for addition and in the opposite direction for subtraction, a wheel on said shaft for driving said number wheels, a single series of order keys, means operable by said order keys for shifting said driving wheel in either direction along said shaft into operative relation to successive number wheels, other key-operated means for rotating said master wheel, a pinion on said shaft, and a second pinion constantly in mesh with the first pinion, said pinions being slidable in opposite directions into and out of mesh with said master wheel to rotate said shaft in one direction for addition or in the opposite direction for subtraction.

5. A calculating mechanism comprising a plurality of number wheels; a shaft on which said wheels are mounted; gear means for rotating said number wheels to accumulate; other gear means for rotating said number wheels to zero; a lever for moving said shaft to shift the number wheels from one of said gear means to the other; and means actuated by said lever for driving the second mentioned gear means.

6. A calculating mechanism comprising a plurality of number wheels; a shaft on which said wheels are mounted; gear means for rotating said number wheels to accumulate; other gear means for rotating said number wheels to zero; a lever for moving said shaft to shift the number wheels from one of said gear means to the other; a wheel arranged to shift with the number wheels into driving relation with the second mentioned gear means; and means actuated by said lever for rotating said driving wheel.

7. A calculating mechanism comprising a plurality of number wheels; a shaft on which said wheels are mounted; gear means for rotating said number wheels to accumulate; other gear means for rotating said number wheels to zero; a lever for moving said shaft to shift the number wheels from one of said gear means to the other; a toothed wheel rotatable on said shaft; a pawl on said lever for driving the toothed wheel; and a gear wheel connected to the second mentioned gear means and adapted to mesh with the toothed wheel.

8. A calculating mechanism comprising a counter; means for actuating said counter; column-selecting means; key-actuated means for operating said column-selecting means; other key-actuated means for operating the column-selecting means and said counter actuating means; and means for preventing the operation of the other key-actuated means upon said column-selecting means.

9. In a calculating machine, a master wheel, a shaft, a plurality of number key levers, connections between said key levers and the master wheel for rotating the latter through variable distances in one direction, means for preventing rotation of the master wheel, a cam, a counter, means on said shaft for actuating the counter, a pinion slidably mounted on said shaft for movement into and out of mesh with the master wheel, and a second pinion continually in mesh with the first mentioned pinion and slidable into and out of mesh with the master wheel, said pinions and said master wheel actuating said shaft in one direction for addition and in the opposite direction for subtraction.

10. A calculating machine having, in combination, a rotatable element, a plurality of key levers, operating connections between said key levers and said element, a member for locking said element against rotation, a bar member for actuating said member, and means including a universal bar arranged to be moved by said key levers and coöperating with said bar to actuate said locking member to engage said rotatable element, and a part on said bar engaged by one of said operating connecting elements to withdraw said locking member from the rotatable element.

11. In a calculating mechanism, a master wheel; an arm pivoted to swing on the axis of said wheel; a pinion on said arm meshing with said wheel; a rack curved concentrically with said master wheel and arranged to mesh with said pinion; means for swinging said arm in opposite directions; and means for disengaging the pinion and the rack from each other upon the completion of the movement of the pinion in one direction.

12. In a calculating mechanism, a master wheel; an arm pivoted to swing on the axis of said wheel; a pinion on said arm meshing with said wheel; a rack curved concentrically with said master wheel and arranged to mesh with said pinion; means for swinging said arm in opposite directions; means for preventing rotation of said master wheel in one direction; and means for moving the rack away from the pinion upon the completion of the movement of the pinion in one direction.

13. In a calculating mechanism, a master wheel; an arm pivoted to swing on the axis of said wheel; a pinion on said arm meshing with said wheel; a rack curved concentrically with said master wheel and arranged to mesh with said pinion; a key lever for swinging said arm in one direction; a spring for swinging said arm in the opposite direction; and means for disengaging the pinion and the rack from each other upon the completion of the movement of the pinion in one direction.

14. In a calculating mechanism, a master wheel; an arm pivoted to swing on the axis of said wheel; a pinion on said arm meshing with said wheel; a rack curved concentrically with said master wheel and arranged to mesh with said pinion; a universal bar attached to said arm; a plurality of key levers for moving said bar in one direction; a spring for moving said bar in the opposite direction; and means for disengaging the pinion and the rack from each other upon the completion of the movement of the pinion in one direction.

15. In a calculating mechanism, a master wheel; and means for rotating said wheel comprising an arm pivoted to swing on the axis of said wheel, means on said arm for engaging and moving said wheel, a universal bar attached to said arm, a plurality of key levers, members attached to said key levers and overlying said universal bar, whereby said bar is moved when one of said key levers is depressed, a spring for moving said bar in the opposite direction, and means for temporarily locking said universal bar to the member corresponding to a depressed key lever.

16. In a calculating mechanism, a master wheel; and means for rotating said wheel comprising an arm pivoted to swing on the axis of said wheel; means on said arm for engaging and moving said wheel; a universal bar attached to said arm, a plurality of key levers, members attached to said key levers and overlying said universal bar, whereby said bar is moved when one of said key-levers is depressed, a spring for moving said bar in the opposite direction, a latch on each of said members for locking said universal bar to the member corresponding to a depressed key lever, and means for releasing said latch.

17. A calculating machine having, in combination, a rotatable element, a member for locking said element against rotation, a plurality of key levers, operating connections between the key levers and the rotatable element, and a universal bar arranged to be moved by said key levers, said bar being in contact with said key levers and having a portion for actuating said locking member.

18. In a calculating mechanism, a master wheel; an arm pivoted to swing on the axis of said wheel; means connected to said arm for turning said wheel; key levers arranged to move said arm variable distances in one direction; means for moving said arm in the opposite direction, and means to prevent rotation of the master wheel.

19. A calculating machine having, in combination, a rotatable element, a member for locking said element against rotation, a plurality of key levers, operating connections between the key levers and the rotatable element, a universal bar arranged to be moved by said levers, and a part operatively connected to one of said operating connecting elements and to said bar, said operating connecting element having a portion fixed to said locking member and adapted to actuate said locking member.

20. In a calculating mechanism, a master wheel; and means for rotating said wheel comprising an arm pivoted to swing on the axis of said wheel, means on said arm for engaging and moving said wheel in one direction, a universal bar attached to said arm, a plurality of key levers, arms linked to said key levers and pivoted on the axis of said wheel, said last mentioned arms overlying said universal bar, and restoring means for the first mentioned arm and said universal bar.

21. In a calculating machine, a master wheel; a plurality of key-levers; connections between the key-levers and the master wheel for rotating the latter variable distances in one direction; means for preventing rotation of the master wheel; a shaft; a driving connection between the master wheel and said shaft; a counter; a gear wheel slidable on said shaft into mesh with successive elements of the counter; a second set of key-levers, means operable by any one of said second-mentioned key-levers for shifting said gear wheel along the shaft in either direction; and means operated by the first mentioned key-levers for shifting said gear wheel along said shaft in one direction.

22. In a calculating mechanism, the combination of a counter, an actuator shiftable into engagement with successive elements of the counter; means for driving the actuator; means operable by said driving means for shifting the actuator; and means for disconnecting said shifting means from the driving means.

23. In a calculating mechanism, a counter; an actuator shiftable into engagement with successive elements of the counter; number key-levers and connections for driving the actuator; means including a pawl and ratchet for shifting the actuator, said pawl being arranged to be moved by the number key-levers; and means holding the pawl out of action when said number key-levers are actuated for adding or subtracting a series of digits of the same order to a total in the counter.

24. In a calculating mechanism, a master gear wheel, a gear rack curved concentrically with said master wheel and spaced therefrom, a pinion mounted between said gear wheel and said rack and meshing with each, means for reciprocating said pinion concentrically with said wheel, and means for moving said rack away from said pinion synchronously with the completion of its movement in one direction.

25. In a calculating mechanism, a master gear wheel, a gear rack curved concentrically with said master wheel but with a greater radius of curvature, a pinion rotatably mounted between and meshing with said wheel and said rack, means for reciprocating said pinion concentrically with said wheel, means for disengaging said pinion from said rack upon the completion of the movement of the pinion in one direction and for simultaneously locking said master wheel.

26. In a calculating mechanism, a plurality of key levers, a universal bar, a stop limiting the downward movement of each of said levers, means set in operation by the depression of each of said keys to prevent relative movement of said key and said bar, each of said levers being operatively connected with said bar, and means preventing upward movement of said bar until one of said levers is depressed to its corresponding stop.

27. A calculating mechanism comprising a master wheel, a shaft driven from said master wheel, a set of number wheels, a wheel on said shaft for driving said number wheels, key-operated means for shifting said driving wheel in either direction on said shaft into operative relation to successive number wheels, additional key-operated means for shifting said driving wheel in one direction, and means for rotating said master wheel.

28. A calculating mechanism comprising a plurality of number wheels, a segmental gear wheel fixed to each of said wheels, a shaft on which said wheels are mounted, gear means for rotating said number wheels to accumulate, second gear means adapted to mesh with said segmental gears, a lever for moving said shaft to shift the segmental wheels from one of said gear means to the other, and means actuated by said lever for driving the second gear means.

In testimony whereof I affix my signature in presence of two witnesses.

FRED W. STILWILL.

Witnesses:
EARL C. CARLSON,
GEORGE L. CHINDAHL.

Copies of this patent may be obtained for five cents each, by addressing the "Commissioner of Patents, Washington, D. C."